United States Patent [19]
Rowe

[11] Patent Number: 6,036,754
[45] Date of Patent: Mar. 14, 2000

[54] ADSORPTION GAS DRYER

[75] Inventor: Matthew Rowe, Morpeth, United Kingdom

[73] Assignee: Brian Walker, Hexham, United Kingdom

[21] Appl. No.: 09/084,085

[22] Filed: May 26, 1998

[51] Int. Cl.$^7$ ............................. B01D 53/04; B01D 53/26
[52] U.S. Cl. ................................................ 96/130; 96/144
[58] Field of Search ............................. 96/108, 130–132, 96/143, 144

[56] References Cited

U.S. PATENT DOCUMENTS 4,097,248   6/1978   Frantz .......................................... 55/33

FOREIGN PATENT DOCUMENTS 2 199 513   7/1988   United Kingdom .

*Primary Examiner*—Robert H. Spitzer
*Attorney, Agent, or Firm*—Larson & Taylor

[57] ABSTRACT

An adsorption dryer includes first and second drying towers. Each tower has a first port and a second port through which gas can pass into or out of the tower. A first and a second manifold are connected respectively to the first and the second ports of both towers. The manifolds each include integral gas passages, each port of the towers being in communication with a gas passage. Each of the manifolds includes at least one integral valve seat upon which a valve actuator is mounted to constitute a valve to control flow of gas through the gas passages.

9 Claims, 5 Drawing Sheets

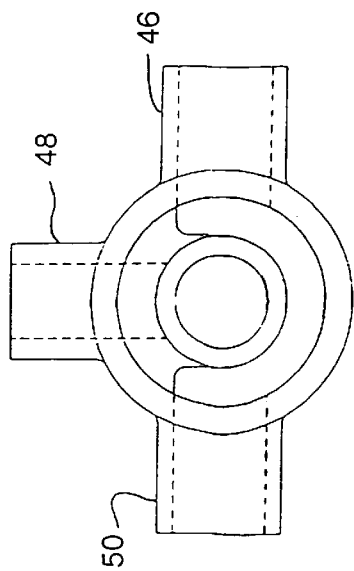
FIG. 7
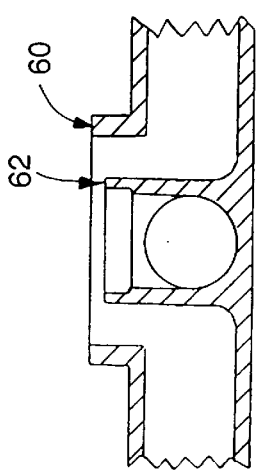
FIG. 6
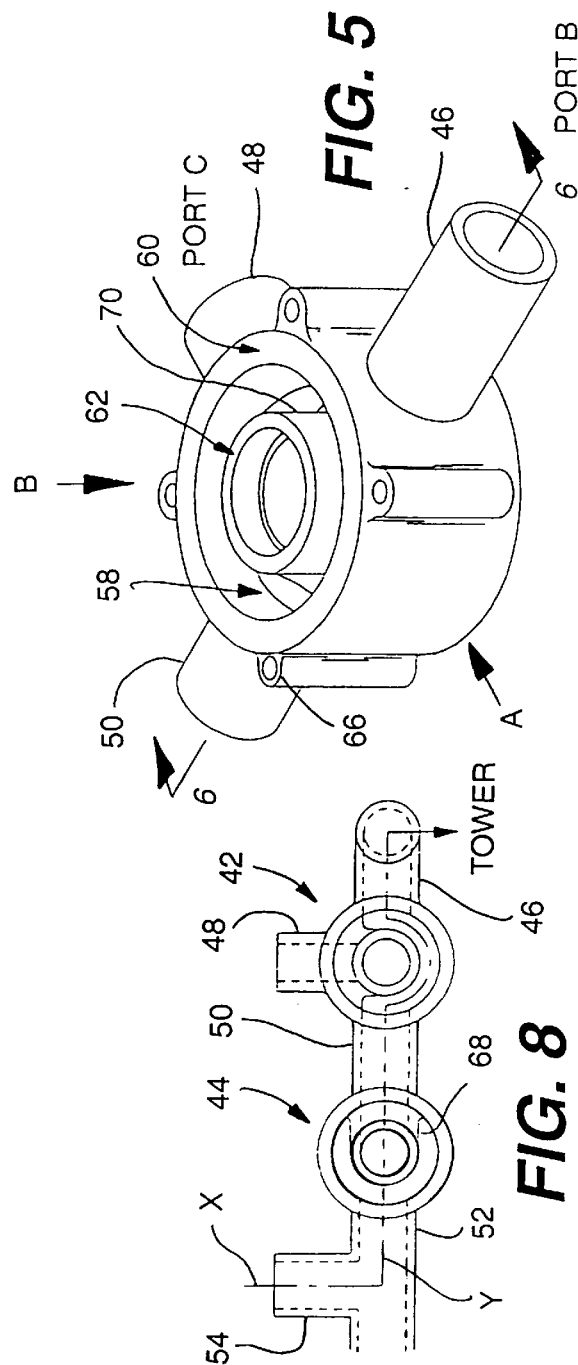
FIG. 5
FIG. 8

ADSORPTION GAS DRYER

BACKGROUND TO THE INVENTION

1. Field of the Invention

Adsorption dryers for compressed air and gases have been known for many years and are widely used throughout the world. Although other types of dryer are available, such as deliquescent and refrigeration dryers, these cannot give a pressure dewpoint as low as that achieved by adsorption dryers and which is essential for many applications.

2. Summary of the Prior Art

Normally, adsorption dryers are dual tower dryers. That is to say, they include two towers of desiccant material (commonly known as beds) one of which is 'on stream' drying the gas whilst the other is being regenerated. In a dual tower dryer, the gas to be dried is passed through the desiccant bed of the on-stream tower continuously, in one direction, during a drying cycle. Then, after a predetermined time interval (this interval being chosen such that the bed will have adsorbed sufficient moisture) the inlet gas is switched to the desiccant bed of the other tower and the first desiccant bed is regenerated by some suitable procedure such as heating, evacuation or passing a purge gas through it, usually in a flow direction opposite to the flow of gas to be dried.

Adsorption dryers are available in at least two distinct types: heat regenerative and heatless. A heat regenerative dryer, as the name implies, uses heat in one form or another to reactivate the wet desiccant bed normally in conjunction with a flow of purge gas. A heatless dryer uses a purge flow of dry gas, which is usually a proportion of gas from the on stream tower, the purge gas being passed through the regenerating bed at a lower pressure than the gas in the on-stream tower. Both types of dryer are normally operated on a fixed time cycle for drying and regeneration and both cycles are usually of an equal duration, or they can be operated in a variable cycle. The cycle times for heat regenerative dryers are usually measured in hours whereas for heatless dryers they are measured in minutes.

To control the flow of gas from one tower to the other, and to control the purge gas, a series of valves are employed. These valves most typically include two inlet valves which switch the gas from one tower to the other, two exhaust valves which control the duration of purge gas flow and repressurisation of the towers, and two outlet check valves. In addition to these six valves, a number of other valves such as purge check valves, repressurisation valves, additional exhaust restrictor valves and so forth may be required.

Hitherto, manufacturers of adsorption dryers have usually sourced commercially available valves and piped them together using butt weld or threaded malleable iron fittings. A number of problems exist with dryers having this style of construction including pressure drop through the individual fittings, leakage through threaded joints, inflexibility with regard to method of actuation and complex and expensive manufacturing procedures. Some manufacturers have attempted to develop manifold systems but these have been limited to using porting blocks made from bar stock attached to butt welded pipework. It is an aim of the present invention to reduce or overcome these disadvantages.

SUMMARY OF THE INVENTION

According to the invention there is provided an adsorption dryer characterised by a first and a second drying tower each having a first port and a second port through which gas can pass into or out of the tower; a first and a second manifold connected respectively to the first and the second ports of both towers, the manifolds, each including integral gas passages, each port of the towers being in communication with a gas passage, and the manifolds each including at least one integral valve seat upon which a valve actuator is mounted to constitute a valve for controlling flow of gas through the gas passages.

In a dryer embodying the invention, the number of joints is minimised so improving reliability and reducing leakage and the complexity of assembly. Furthermore, the passages within the manifold can be formed to a length and shape, and the valve seats can be positioned to exactly correspond with the positions of the towers, unlike in the prior art where the positions of the pipes is determined by the positions of the valve ports.

Each manifold may be formed as a casting, for example of aluminum alloy, spheroidal graphite iron, or plastic material such as polycarbonate.

Most typically, one manifold acts as a wet gas inlet and the other manifold as the dry gas outlet.

A dryer embodying the present invention most commonly comprises two similar towers, each having an upper and a lower port, and upper and lower manifolds, the upper manifold being connected to the upper ports of both of the towers and the lower manifold being connected to the lower ports of both of the towers.

A drier embodying the invention may be heatless or heat reactivated, upflow or downflow types of adsorption dryers.

Preferably, a drier embodying the invention includes integrally within at least one manifold a 2/2 valve having a third port and an integral bypass tee. This allows a compact configuration of the valves and can help to reduce the length of the flow passages (and hence pressure drop) and also considerably reduces the physical size of the dryer by allowing substantially all of the valves and gas passages to be disposed between the towers.

Conventionally, separate control enclosures are provided which add to cost and to size and can lead to problems with electrical protection from ingress of moisture and dust. A control system for a dryer embodying the invention may be positioned within or on a manifold.

Hitherto, valves have been attached through pipework to the towers by means of screwed unions or gaskets. These are difficult to seal and are prone to subsequent leakage. More advantageously, embodiments of the present invention may use O-rings located in nozzles of the towers to provide a seal with the manifold. These O-rings serve two purposes in that they not only provide compound sealing between the manifold and the vessel towers, but that they also captively hold desiccant support screens in place in the towers so that the manifolds can be removed from the towers without fear that the desiccant beads will fall out of the towers, thus making maintenance a much simpler task.

Embodiments of the invention can incorporate, for example, poppet or piston actuated valves or diaphragm valves.

BRIEF DESCRIPTION OF THE DRAWINGS

FIG. 5 shows an exhaust valve seat component which is part of the dryer of FIG. 1;

FIGS. 6 and 7 are sections through the valve of FIG. 5 respectively in the direction of arrows A and B;

FIG. 8 is a section through part of a manifold, which shows the valve component of FIG. 5.

DETAILED DESCRIPTION OF THE PREFERRED EMBODIMENT

Figure 1:
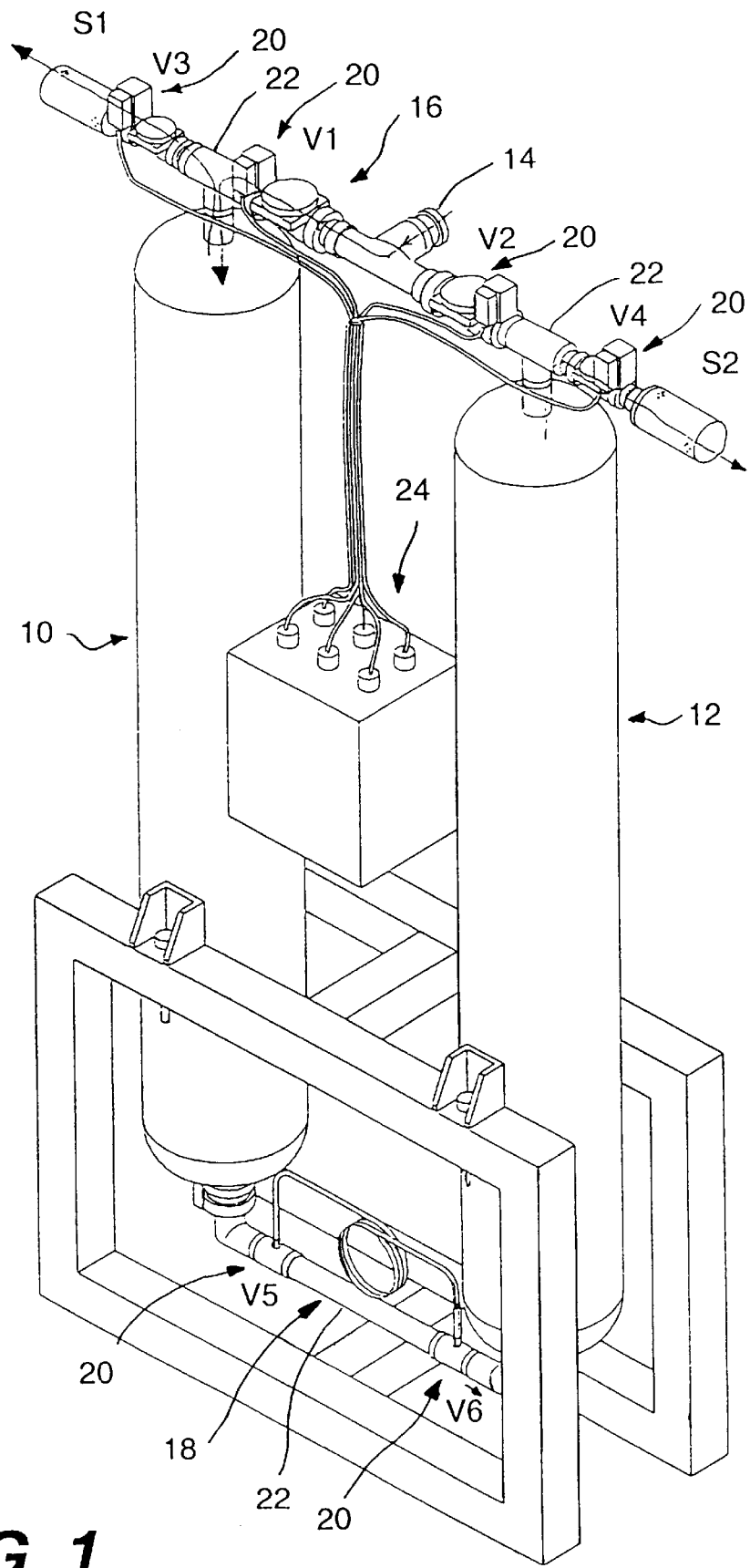
FIG. 1 shows a conventional adsorption dryer.

FIG. 1 shows a typical prior art adsorption dryer. The dryer comprises first and second drying towers 10, 12 each containing desiccant material. The towers 10,12 are generally cylindrical and are disposed in an upright orientation.

Gas to be dried is received by an inlet pipe 14 from where it is conveyed to the towers 10,12 through an inlet system 16 of pipes and valves mounted above the towers 10,12. Gas exiting from the towers 10,12 is received by an outlet system 18 of pipes and valves mounted below the towers 10,12.

The inlet and outlet systems 16,18 will not be described here in detail because they are not directly relevant to the present invention. However, it will be noted that each system is constructed from commercially available solenoid-operated valves 20 with either butt welded or threaded malleable iron interconnecting pipework 22. The systems include a large number of joints, each of which is a site of a potential leak and an obstacle to smooth gas flow, and each of which contributes to the labour involved in construction of the dryer. Operation of the valves is controlled by a control unit 24.

An embodiment of the invention is illustrated in FIGS. 2 to 9. For the purposes of this description, a heatless downflow dryer utilising diaphragm valves is used as an example. However, it will be realised that the invention is not restricted in application to dryers of this type.

Figure 2:
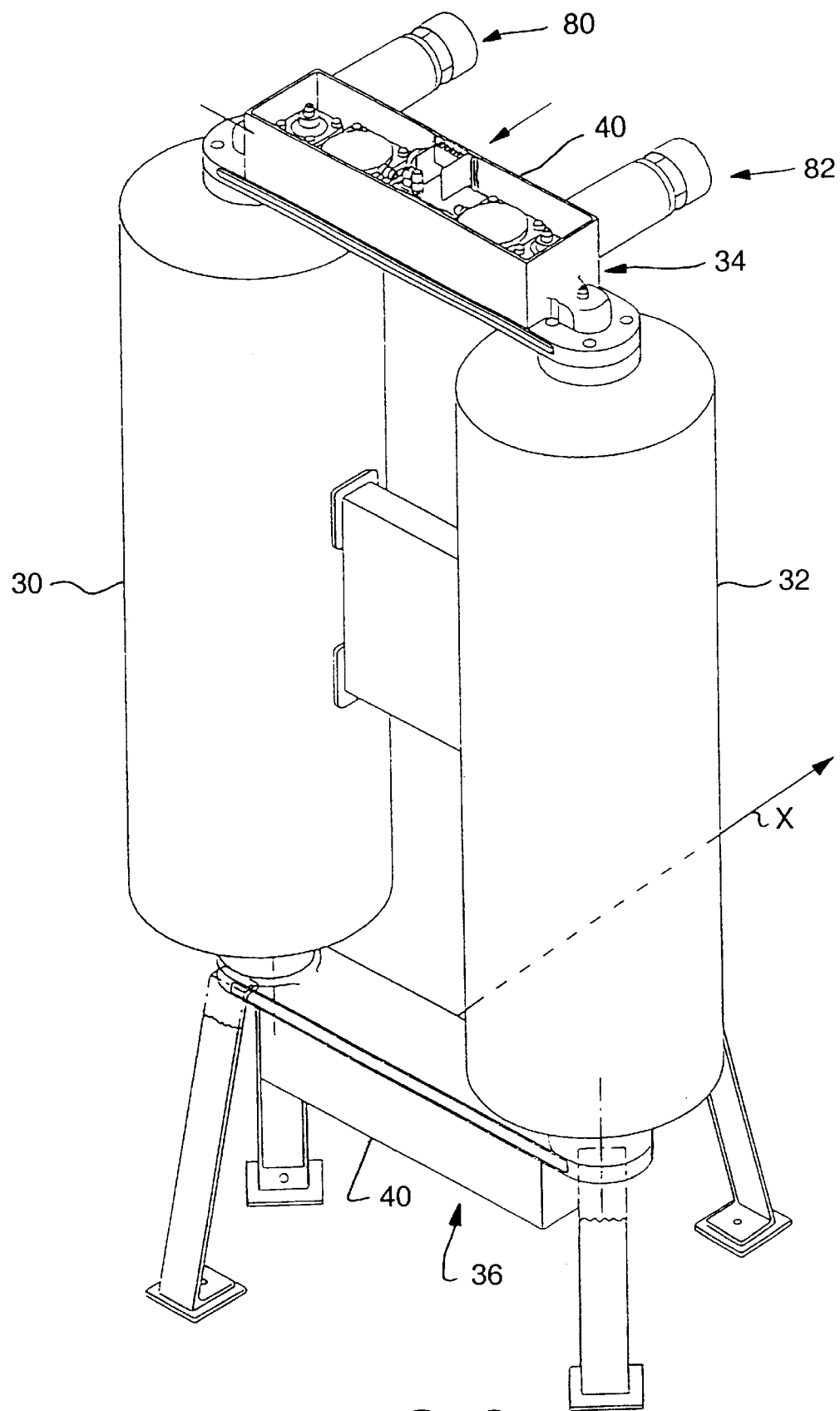
FIG. 2 shows an adsorption dryer which is an embodiment of the invention.
Figure 3:
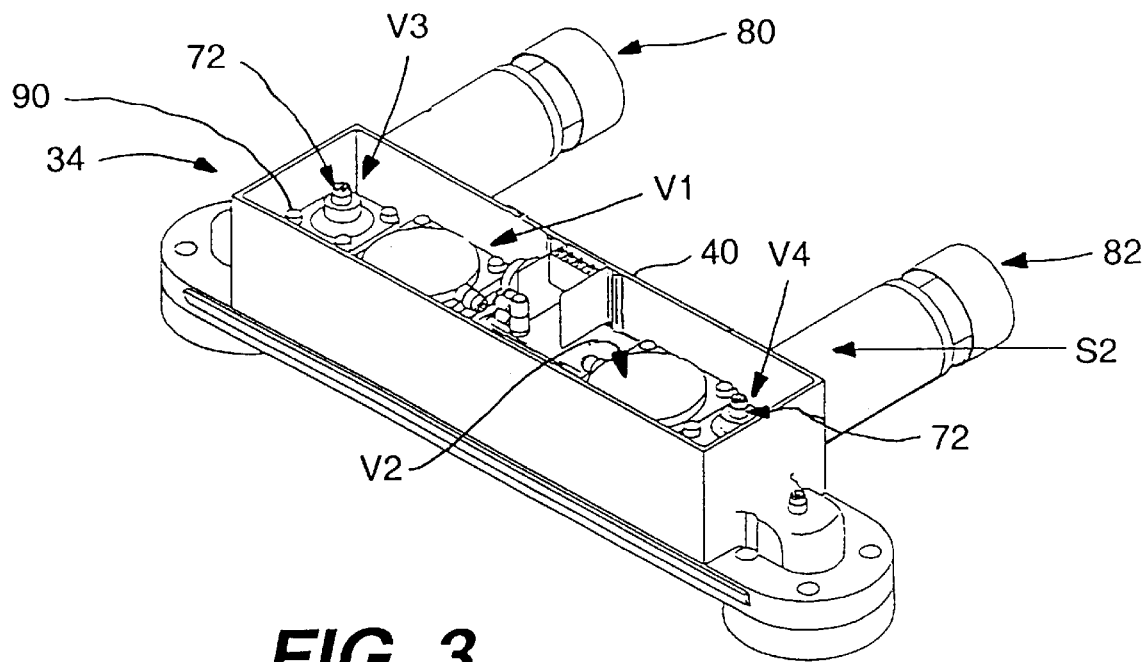
FIG. 3 is an upper valve manifold of the dryer of FIG. 1.
Figure 4:
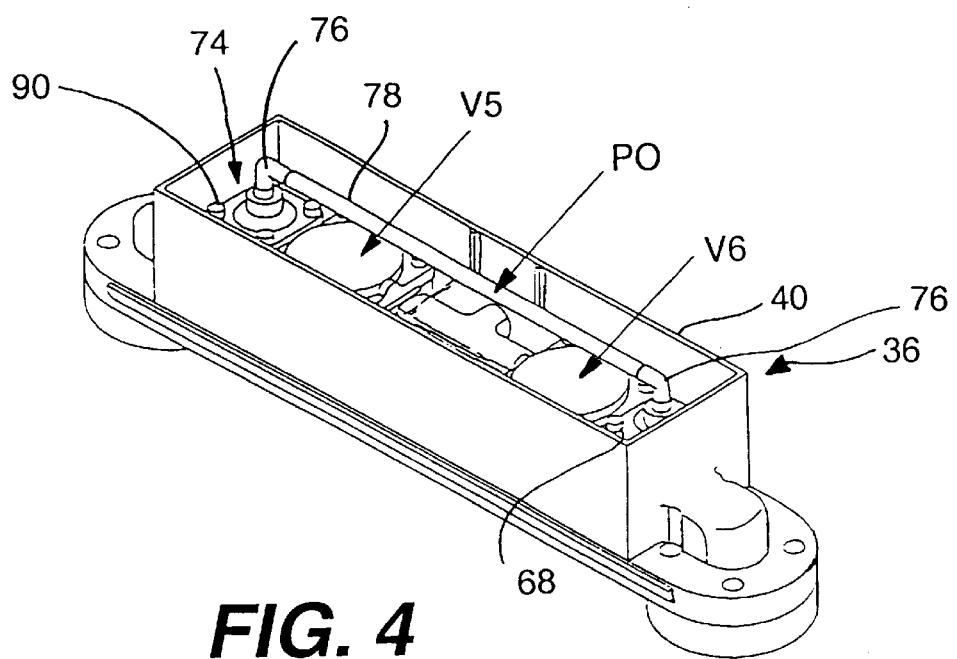
FIG. 4 is a lower valve manifold of the dryer of FIG. 1 shown inverted for clarity.
Figure 9:
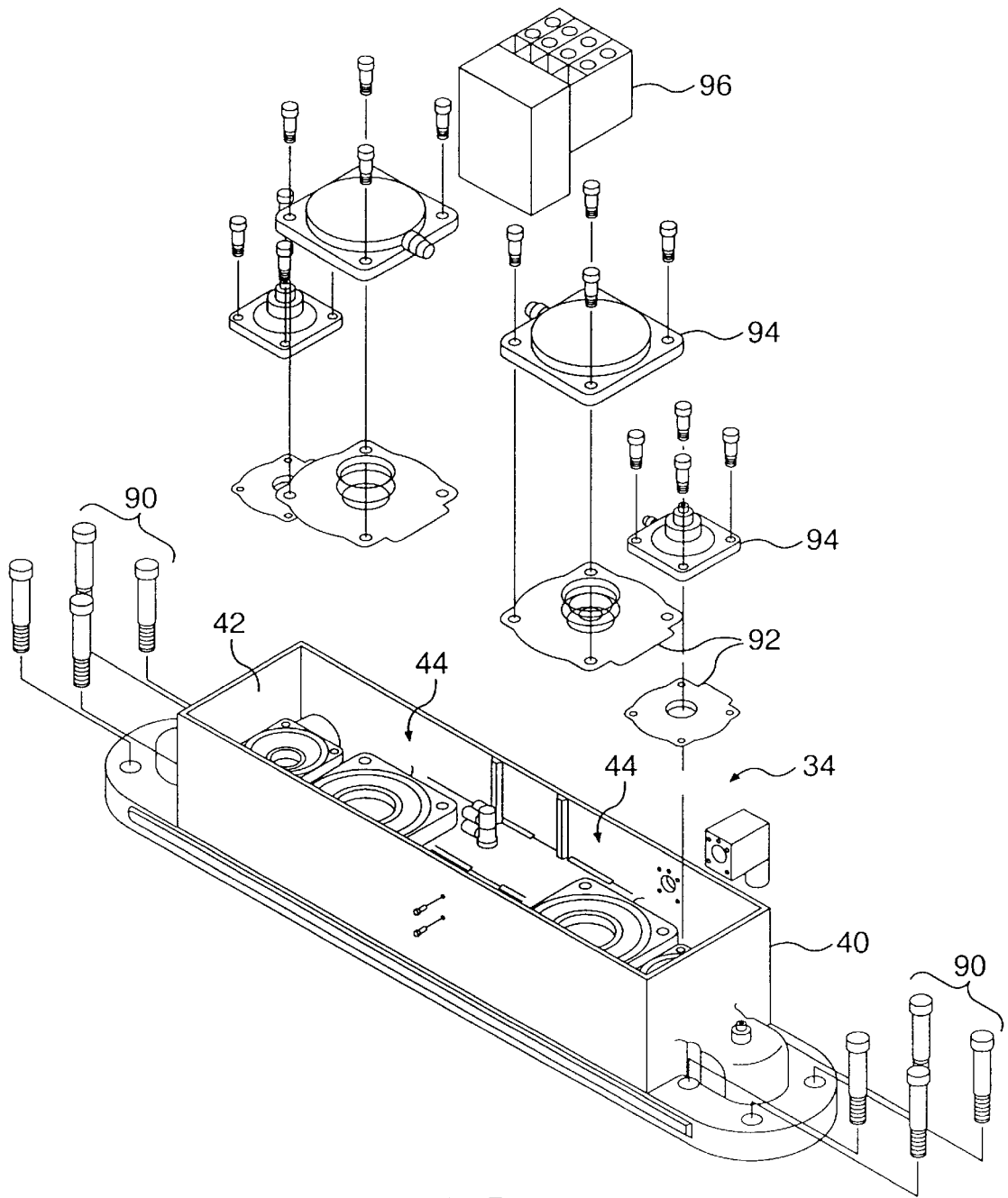
FIG. 9 is an exploded diagram of the manifold of FIG. 3.

With reference now to FIG. 2, a dryer embodying the invention comprises first and second drying towers 30,32, each containing desiccant material. The towers 30,32 are generally cylindrical and are disposed in an upright orientation. Each tower 30,32 has an upper and a lower port through which gas can pass into and out of the tower.

An inlet manifold 34 is connected to the upper ports of both towers 30,32 and an outlet manifold 36 is connected to the lower ports of both towers 30,32.

The two manifolds 34, 36 are constructed around identical castings 40. Various materials can be used for the casting ranging from Aluminium alloys to Spheroidal Graphite Iron to Polycarbonate composite plastics. Each casting 40 is symmetrical about a centre plane X between the towers 30,32.

Within each casting 40 is formed four valve seats 42,44. The valve seats 42,44 are disposed in line Y in a direction perpendicular to the plane of symmetry X (see FIG. 8), such that two of the valve seats 42 are comparatively further from the plane X such that the other two of the valve seats 44 are closer to the plane X.

FIGS. 5 to 7 show diagrammatically the valve seats 42, 44 and a surrounding region of the manifold 40. It should be understood that these figures show a portion of an integral casting. These are not separate components.

The valve seats 42 further from the plane X communicate with first, second and third gas passages 46,48,50. The first gas passage 46 carries gas to the connection with the port of the corresponding tower 32,34. The second gas passage 48 carries gas to a first external connection point of the casting 40. The third gas passage 50 carries gas to adjacent valve seat 44 closer to the plane X.

The two valve seats 44 closer to the plane X each additionally communicate with one another through a fourth gas passage 52. A side branch 54 of the fourth gas passage 52 extends to carry gas to a central external connection point of the casting.

It must be borne in mind that the above-described arrangement appears symmetrically disposed to both sides of the plane X.

Each of the valve seats 42, 44 includes a cylindrical valve chamber 58 within the casting. Each chamber 58 has one open end, and the open end is surrounded by an annular first sealing surface 60.

In the case of the valve seats 42 further from the plane X, the first and third gas passages 46,50 enter the chamber 58 at respective radial openings. The second gas passage 48 enters the chamber 58 within a tubular formation 70 formed integrally with the casting 40. The tubular formation 70 enters the chamber 58 radially, in a direction at right angles to the first and the third gas passages 46,50, and then turns through a bend of 90° such that an end portion of it is concentric with the chamber 58. An end surface of the tubular formation forms an annular second sealing surface 62 concentric with, and spaced axially into the chamber 58 from, the first sealing surface 60.

In the case of the valve seats 44 closer to the plane X, the fourth gas passage 52 enters the chamber 58 at a radial opening. The third gas passage 50 enters the chamber 58 within a tubular formation 68 formed integrally with the casting. The tubular formation 68 enters the chamber 58 radially, in a direction diametrically opposite to the third gas passage 50, and then turns through a bend of 90° such that an end portion of it is concentric with the chamber 58. An end surface of the tubular formation forms an annular second sealing surface 62 concentric with, and spaced axially into the chamber 58 from, the first sealing surface 60.

In both of the valve seats 42,44 described in the last two preceding paragraphs, four tapped bores 66 are formed in the casting spaced around the first sealing surface 60. These bores 66 can receive fasteners 90 (FIG. 3) to secure a valve actuator 72 or another component can be secured in place on the casting 40 to form a valve or some other component to control flow of gas within the manifold.

Where a valve is to be constructed on a valve seat 42, 44, the configuration of the actuator 72 is determined by the function that the valve is to perform. In each case, in the present embodiment, the actuator 72 includes a diaphragm 92 under a cap 94 which is sealed against the first sealing surface 60 and which can be urged against the second sealing surface 62 to close the port connected thereto. The diaphragm 92 may be operated by a solenoid or under pneumatic control, as is convenient or it may be self-actuating.

In this embodiment, the inlet manifold 34 includes two types of valve. Those valves V3, V4 constructed on valve seats further from the plane X are three-ported bypass 2/2 exhaust valves. The actuator 72 in this case comprises a pneumatically operated diaphragm. When the valve V3,V4 is open, gas can flow between the first, second and third gas passages 46,48,50. When closed, gas can no longer flow into the second gas passage 48. Closure of the valve V3,V4 does not prevent flow around the tubular formation between the first and the third gas passages 46,50. Those skilled in the art will recognise that operation of this valve differs from a conventional 3/2 valve.

Valves V1 and V2, which are two-ported 2/2 inlet valves, are constructed on the valve seats 44 closer to the plane X of the inlet manifold 34. The actuator 72 for these valves comprises a pneumatically operated diaphragm. When these valves V1,V2 are open, gas can flow between the third and the fourth gas passages 50,52. When they are closed, such flow is prevented.

A respective silencer 80, 82 is connected to each of the first external connection points of the inlet manifold 34. The central external connection point of the inlet manifold 34 receives a supply of gas to be dried.

A control unit 96 for controlling operation of the dryer is mounted centrally on the inlet manifold 34.

In the outlet manifold 36, the first external connection points are blocked. This may be done either with a plug inserted into them, or the connection points may simply not be drilled during manufacture of the casting 40. The central connection point provides an exit for dried gas.

On the outlet manifold 36, the valve seats 42 further from the plane X are not used to construct valves as such. Rather, a respective cap 74 is secured to each of them by fasteners 90 to form a seal with the first sealing surface 60. The cap 74 has a drilling through it into which a pipe fitting 76 is secured. A pipe 78 is connected between the pipe fittings 76 of both of the valve seats 42 further from the plane X. The pipe fittings 76 have a flow passage to permit gas to flow from within the chamber 58 of the valve seat 42 into the pipe 76. Within the drilling, there is formed a flow-restricting orifice which serves to restrict the rate of flow of gas through the drilling.

On the outlet manifold 36, valves V5 and V6 are constructed on the valve seats 44 closer to the plane X. These valves are self-actuating check valves which permit gas to flow through them in one direction only: that is, in a direction from the third gas passage 50 into the fourth gas passage 52.

In operation, suppose initially that the first tower 30 is being used to dry the incoming gas and the second tower 32 is being regenerated having been saturated on the preceding drying cycle. Valve V1 would be open and valve V2 would be closed, thus directing the incoming gas stream through the first tower 30. To prevent the incoming gas from escaping through the first silencer 80, valve V3 remains closed.

Meanwhile, valve V4 is open, so that the second tower 32 can depressurise through the second silencer 82. The check valve V6 is closed, preventing flow towards the second tower 32 of the gas stream exiting the first tower 30. The check valve V5 allows the dried gas stream to exit through the central external connection of the outlet manifold 36 to the outlet.

A small bleed of purge gas is taken from the gas stream exiting the first tower 30. The purge gas is bled from the dried gas stream through the pipe 76. The purge gas will, of course, also have passed through the orifice in each of the pipe fittings, expanding as it does so, the result being that its pressure is reduced from typically 7 barg and 35° C. to substantially atmospheric pressure. The purge gas then passes through the second tower 32 stripping the adsorbed moisture from the bed, and then passes through valve V4 and out via the second silencer 82.

When the purge gas has desorbed the moisture from the second tower 32, the valve V4 is closed to allow the second tower 32 to repressurise via the pipe 76. When the second tower 32 has reached its operating pressure, the valve V2 is opened and the valve V1 is closed to then direct the incoming gas stream through the second tower 32.

In order to regenerate the first tower 30 (which has been saturated) the valve V3 is opened so that the first tower 30 can depressurise through the first silencer 80. The check valve V5 is closed and the check valve V6 is opened to allow the dried gas stream to exit via the outlet. Once again a small bleed of purge gas is passed through the pipe 76 (but in the reverse direction) to pass through the first tower 30 stripping the adsorbed moisture from the bed before passing through the valve V3 and out via the first silencer 80.

When the purge gas has desorbed the moisture from the first tower 30, the valve V3 is closed, and the first tower 30 repressurises via the pipe 76. When the first tower 30 reaches its operating pressure and the second tower 32 has become saturated, the valves V1 and V2 switch once again. The entire cycle repeats continuously.

Various energy management systems are available and can be applied to dryers embodying the invention.

For large dryers, the valves V1, V2, V5 and V6 can use a duplex configuration in which two small valve mechanisms work in parallel to provide a means for a higher flowrate. In this configuration, two or more tubular formations 68, each cooperate with a respective actuator 72 or cap 74 within a common chamber 58. This configuration has several advantages over use of a single large valve. It increases usage of small valve parts thereby cutting purchase costs, tooling costs and inventory costs. It also reduce the casting size.

What I claim is:

1. An adsorption dryer comprising a first and a second drying tower each of said towers having a first port and a second port through which gas can pass into or out of the tower; a first manifold and a second manifold connected respectively to the first and the second ports of both towers, the manifolds each being constructed as a respective casting or moulding, and each manifold including integral gas passages, each port of each of the towers being in communication with an integral gas passage, and the manifolds each including at least one integral valve seat upon which a valve actuator is mounted to constitute a valve for controlling flow of gas through said gas passages, at least one of the valves being a three-port 2/2 valve which, in an open condition, permits passage of gas between all three of its ports and which, in a second condition, inhibits flow of gas through one of its ports while allowing passage of gas between the other two of its ports.

2. An adsorption dryer according to claim 1 in which an exhaust valve of the dryer is a three-port 2/2 valve.

3. An adsorption dryer according to claim 1 in which one of the manifolds is an inlet manifold and the other of the manifolds is an outlet manifold.

4. An adsorption dryer according to claim 3 in which inlet valves and exhaust valves are disposed on said inlet manifold said inlet valves being positioned between the exhaust valves.

5. An adsorption dryer according to claim 4 in which all of the valve seats of the inlet and exhaust valves are formed on the casting or moulding.

6. An adsorption dryer according to claim 1 in which on at least one of the manifolds there is provided a permanently-open interconnection path between the towers to provide a path for gas to flow directly therebetween.

7. An adsorption dryer accordingly to claim 6 in which the interconnection path includes at least one orifice to restrict the flow of gas between the towers.

8. An adsorption dryer according to claim 6 in which the interconnection path includes a pipe external of the manifold.

9. An adsorption dryer according to claim 8 in which the pipe is connected at each of its ends to a cap secured to a respective one of the valve seats.

* * * * *